May 3, 1960     E. W. SMITH     2,934,973
MECHANICAL DEVICE
Filed March 12, 1958
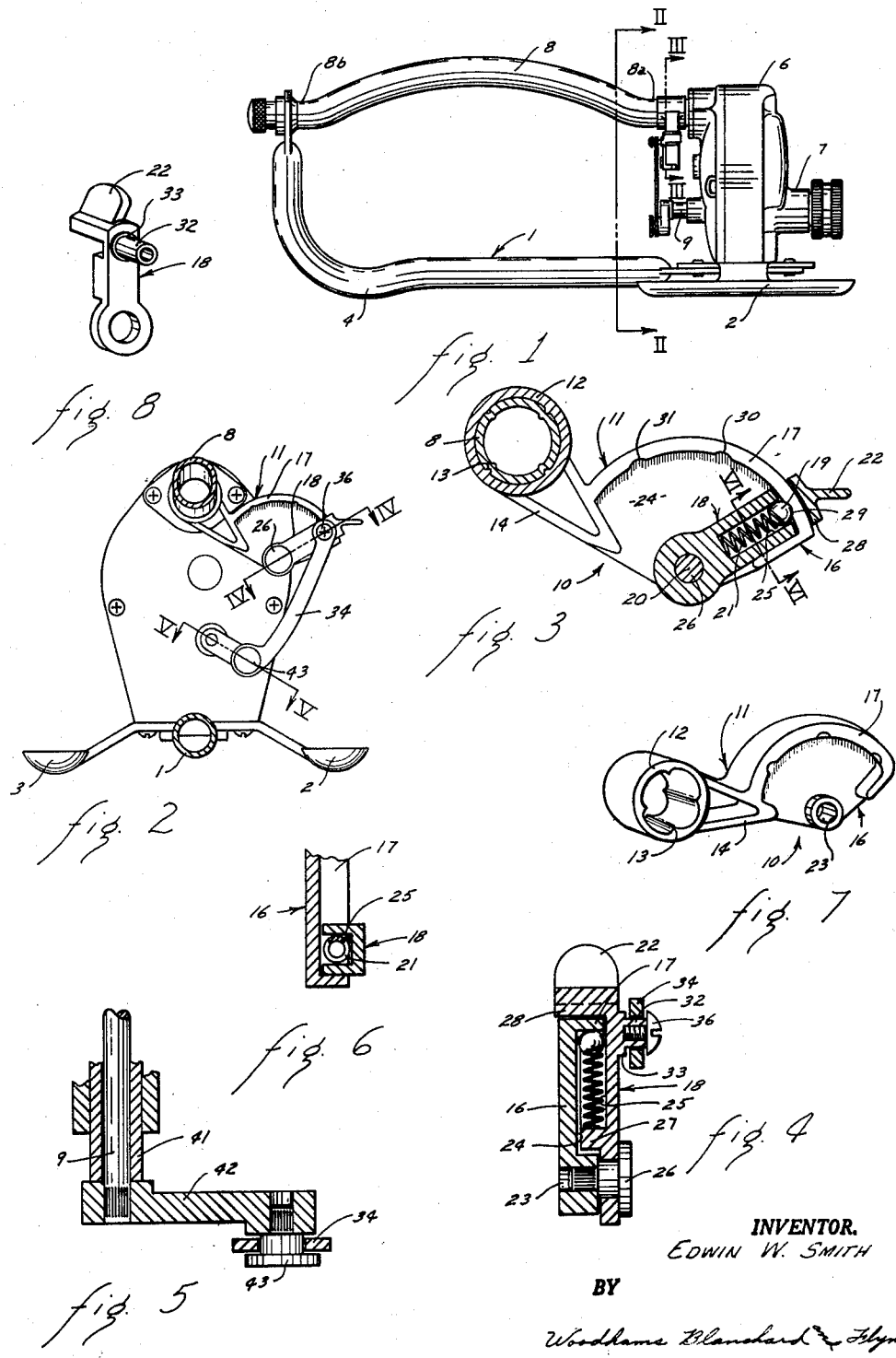
INVENTOR.
EDWIN W. SMITH
BY
Woodhams Blanchard & Flynn
ATTORNEYS

# United States Patent Office 2,934,973
Patented May 3, 1960

2,934,973

MECHANICAL DEVICE

Edwin W. Smith, Climax, Mich., assignor to Atlas Press Company, Kalamazoo, Mich., a corporation of Michigan Application March 12, 1958, Serial No. 720,899

4 Claims. (Cl. 74—600)

This invention relates to lawn sprinkler construction and it relates particularly to mechanism for adjusting the pattern and extent of water distribution effected by an oscillatory type of lawn sprinkler.

In the design of lawn sprinklers of the oscillatory type, it has long been recognized that it is desirable for the user to be able to regulate the pattern and extent of water distribution effected by the sprinkler so that the user can quickly and easily effect a desired adjustment at the time and place of use. This is especially true inasmuch as such sprinklers are normally designed for covering a relatively large area and accordingly when they are to be used to cover smaller areas with relatively greater saturation or larger areas with relatively lighter saturation, it is desirable to enable the user to make a suitable adjustment for the modified purposes quickly and easily at the time and place of use.

Inasmuch as lawn sprinklers are used by a wide variety of persons, and are often used unskillfully and roughly, it is essential that any mechanism and particularly any adjusting mechanism which is supplied with them be strong and sturdy and capable of withstanding severe and often unreasonable abuse. However, since sprinklers are made in extremely large numbers and are a relatively inexpensive product, it is equally necessary that the necessary strength and sturdiness be obtainable without additional cost. Still further, since the adjusting mechanism will be used by unskilled persons and often only with very casual, if any, reading of directions, it is necessary that the use of the mechanism be virtually self-evident and that even improper use will not injure it.

Accordingly, a major object of the invention is to provide an adjusting mechanism for an oscillatory type of lawn sprinkler.

A further object of the invention is to provide a mechanism as aforesaid which will be strong and sturdy and capable of withstanding considerable abuse without suffering appreciable injury.

A further object of the invention is to provide an apparatus as aforesaid in which the adjusting mechanism will be accurate, its use and manner of operation self-evident upon mere inspection of the device and whose use will be smooth and easy to carry out.

A further object of the invention is to provide a mechanism as aforesaid having the advantages of aforesaid which can be applied without appreciably increasing the cost of the apparatus over that of other adjusting devices already known for this type of use.

Other objects and purposes of the invention will be apparent to persons acquainted with devices of this general type upon reading the following disclosure and inspecting the accompanying drawings.

In the drawings:

Figure 1 is a side view of a sprinkler fitted with an adjusting mechanism embodying the invention.

Figure 2 is a section taken on the line II—II of Figure 1.

Figure 3 is a section taken on the line III—III of Figure 1.

Figure 4 is a section taken on the line IV—IV of Figure 2.

Figure 5 is a section taken on the line V—V of Figure 2.

Figure 6 is a section taken on the line VI—VI of Figure 3.

Figure 7 is a perspective view of the driven crank.

Figure 8 is a perspective view of the adjustment lever.

Referring now to the drawings, it will be recognized that the adjusting mechanism of the invention can be used on sprinklers of a variety of specific designs and hence the particular design here utilized for illustrative purposes will be understood as for illustrative purposes only and is not to be taken as limiting. However, for the purpose of better illustrating the invention and for convenience in reference, some description of the sprinkler with which the apparatus of the invention is here illustrated will be presented.

A sprinkler frame 1 is supplied with a pair of supporting feet or runners 2 and 3 for supporting one end thereof, and it preferably has a portion 4 bent for providing a third means for engaging a supporting surface. One end of said frame structure 1 supports a housing 6 to which is supplied water under pressure through an inlet 7. Water is discharged from said housing into the water tube 8. Said tube 8 is oscillatably supported at one end 8a within the housing 6 and is supported at its other end 8b within a suitable bearing at the end of the frame structure 1. A water wheel of known construction, such as that shown in application Serial No. 636,161 assigned to the same assignee as the present application, is located within the housing 6 and supplies a rotary motion to the power output shaft 9. The apparatus of the present invention is intended to convert the rotary motion from the shaft 9 into oscillations of adjustable amplitude of the water discharging tube 8.

A driven crank 11 is provided with a collar 12 which encircles the tube 8 and in this embodiment is engaged therewith by a series of internal ridges of which one is indicated at 13.

A bracket 14 is provided for mounting the collar 12 onto the body part 10 of said crank. The body 10 of the crank 11 includes a laterally extending quadrant 16 having an opening 23 (Figure 4) therethrough centered on a reference point 20 spaced from the center of the collar 12. A generally arcuate recess 24 is provided in one face of said body member 16 for defining an arcuate ridge 17, said arcuate ridge being centered on the reference point 20 concentrically with the opening 23.

A lever 18 is pivotally mounted by the pin 26 for movement concentrically with the opening 23. It has a flange 27 extending toward the bottom of the recess 24, and a longitudinally extending channel 25 beginning at said flange for holding the spring 21 by which a ball 19 is resiliently urged against the inside of the arcuate ridge 17. The spring lies within said channel with one end bearing against said flange and the other end bearing against said ball. A further flange 28 extends from the body of the lever 18 across the peripheral surface of the quadrant 16 and acts somewhat as a guide and bearing surface for insuring smooth and accurate movement of the lever pivotally on and with respect to said quadrant. A handle 22 is provided for the convenient engagement of the lever 18. A plurality of detent recesses of which three are shown at 29, 30 and 31 are provided for temporarily locating the lever at preselected locations.

Said lever is further provided with a boss 32 having the shoulder 33 thereon. A link 34 has an opening therein by which it is received over the boss 32. Means, such as the screw 36, are provided for holding said link 34 pivotally on the boss 32.

The shaft 9 is preferably supported by a bearing 41 which extends to a point near the outer end thereof. A driving crank 42 is fastened rotatably on the end of the shaft 9 by any convenient means such as splining, and may conveniently abut the end of the bearing sleeve 41. The link 34 is pivotally affixed to the end of the crank 42 by a pin 43.

In operation, rotation of the shaft 9 will effect a revolution of the pin 43 around the center of said shaft and thereby effect corresponding actuation of the lower end of the lever 34. This will effect a reciprocation of the end of the crank 11 and will thereby effect oscillation of the collar 12 and of the water tube 8 affixed thereto. By moving the lever 18 pivotally around the reference point 20 the screw 36 on which the upper end of the link 34 may be caused to assume a selected distance from the center of rotation of the collar 12. Thus, the reciprocating motion of the link 34 imposed by the crank 42 may be caused to effect oscillations of varying amplitude of the collar 12. The detent structure including the ball 19 and the corresponding recesses on the radially inside wall of the flange 17 will retain the lever 18 and the screw 36 held thereon in selected positions as desired until the detent mechanism is overcome by the manual application of force to the lever 22.

While the structure embodying the invention here illustrated utilizes a fixed crank on the output shaft 9 and what is in effect a crank of adjustable throw on the water tube 8, it will be recognized that these parts can be reversed without departing from at least the broader objectives of the invention. However, the form shown is preferred in view of the more readily accessible position of the handle 22 afforded thereby.

Although this particular embodiment of the invention has been hereby used for illustrative purposes, it will be recognized that certain variations may be made from the specific construction here shown and that such variations will fall within the scope of the hereinafter appended claims, excepting as said claims by their own terms may expressly provide otherwise.

What is claimed is:

1. An oscillatable mechanism for an oscillating sprinkler, comprising: an elongated member and means supporting said member for rotation about an axis extending lengthwise thereof; a driven crank non-rotatably secured to said member between its ends and extending sidewardly therefrom, said driven crank including a body part having an arcuate flange extending therefrom in the direction of the lengthwise extent of said member; said flange being of substantially constant radius from a reference point on said body part and having one end adjacent a plane defined by said axis and said point, said flange having a plurality of circumferentially spaced, locating means thereon; a lever pivotally mounted on said body part for pivotal movement about said reference point; detent means on said lever resiliently engageable with said locating means for releasably locating said lever in a variety of positions with respect to said body part; drive means secured to said lever at a point thereon spaced from said reference point for oscillating said driven crank through an arc whose amplitude may be varied by changing the position of said lever with respect to said body part.

2. An oscillatable mechanism for an oscillating sprinkler, comprising: an elongated discharge head and means supporting said head for rotation about an axis extending lengthwise thereof; a driven crank non-rotatably secured to said head between its ends and extending sidewardly therefrom, said driven crank including a substantailly quadrant-shaped body part, said body part having an arcuate flange projecting therefrom in the direction of the lengthwise extent of said head, said flange being of substantially constant radius from a reference axis through said body part and said flange extending through an arc of approximately 90 degrees from a plane defined by said axes, said flange having a plurality of circumferentially spaced recesses on the inner surface thereof; a lever pivotally mounted on said body part for rotation about said reference axis and extending radially therefrom, said lever having an arcuate slot into which said flange extends and an opening communicating with said slot; a ball mounted in said opening and resilient means urging said ball outwardly toward said slot, said ball being receivable into said recesses and being movable therebetween upon pivoting of said lever with respect to said body part so that said lever may be releasably held in a variety of positions with respect to said body part, said lever having a manually engageable portion located outwardly of said body part whereby said lever may be moved between said positions; drive means including linkage secured to said lever adjacent the outer end thereof for oscillating said driven crank through an arc whose amplitude may be varied by changing the position of said lever with respect to said body part.

3. A mechanism according to claim 2 wherein said body part has a planar surface adjacent said lever and said flange has substantially radially inwardly extending portions at the respective circumferential ends thereof against which said lever may abut whereby said lever may be located in its terminal positions with respect to said body part.

4. A mechanism according to claim 3 wherein said crank includes a bracket extending substantially radially from said body part adjacent one circumferential end of said flange and said bracket has a ring at its outer end through which said member extends.

References Cited in the file of this patent

UNITED STATES PATENTS

| 376,059 | Barber | Jan. 10, 1888 |
| 936,213 | Bordenkircher | Oct. 5, 1909 |
| 1,551,054 | Pribnow | Aug. 25, 1925 |
| 1,696,385 | Coles | Dec. 25, 1928 |
| 2,546,241 | Squiers | Mar. 27, 1951 |
| 2,676,842 | Squiers | Apr. 27, 1954 |
| 2,728,244 | O'Shei | Dec. 27, 1955 |
| 2,815,681 | Williams | Dec. 10, 1957 |
| 2,886,250 | Smith et al. | May 12, 1959 |
| 2,893,251 | McWethy | July 7, 1959 |

FOREIGN PATENTS

| 252,070 | Italy | Feb. 19, 1927 |